United States Patent Office 3,714,139
Patented Jan. 30, 1973

3,714,139
OPTIONALLY SUBSTITUTED ASPARTYL CYCLO-
HEXYLALANINE LOWER ALKYL ESTERS, COM-
POSITIONS AND METHOD
James M. Schlatter, Glenview, Ill., assignor to
G. D. Searle & Co., Chicago, Ill.
No Drawing. Filed July 14, 1969, Ser. No. 841,582
Claims priority, application Great Britain, July 17, 1968,
33,971/68
Int. Cl. C07c 103/52
U.S. Cl. 260—112.5
5 Claims

ABSTRACT OF THE DISCLOSURE

Potent sweetening agents comprising lower alkyl esters of dipeptides containing the N-terminal residue of aspartic acid and the residue of an optionally substituted cyclohexylalanine are prepared by hydrogenation of the corresponding dipeptides containing the N-terminal residue of aspartic acid and an optionally substituted phenylalanine.

---

The present invention relates to novel compounds and compositions which are especially useful in view of their sweetening properties and also to novel methods for the use of those compounds and compositions as sweetening agents.

The novel compounds of this invention are represented by the following structural formula

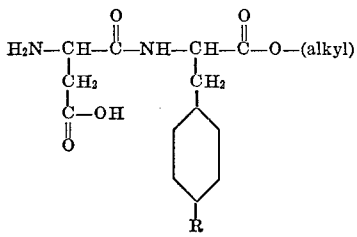

wherein R is selected from the group consisting of a hydrogen atom, a hydroxy radical and an alkoxy radical containing 1–7 carbon atoms, the alkyl radical containing 1–7 carbon atoms, and the stereochemical configuration being DL-DL, L-L, DL-L, or L-DL.

Examples of the alkyl radicals symbolized in the foregoing structural formula are methyl, ethyl, propyl, butyl, pentyl, hexyl, heptyl and the branched-chain isomers thereof.

The dipeptide derivatives of the present invention are uniquely characterized by the completely unexpected property of possessing a sweet taste. Thus, by virtue of possessing this property these compounds can be usefully employed to impart sweetness to edible materials. The term "edible materials" as used here and throughout the specification signifies all nontoxic substances consumable by humans or other animals in solid or liquid form. Illustrative of such substances are: foods, including foodstuffs; prepared food items; chewing gum and beverages; food additives, including flavoring and coloring agents as well as flavor enhancers; and pharmaceutical preparations.

The compounds of Formula I provide advantages as sweetening agents in view of their physical form and stability. Thus for example a representative species of Formula I, i.e. L-α-aspartyl-L-hexahydrophenylalanine methyl ester, has been found to be a crystalline material which does not possess hygroscopic properties. In view of their crystalline form, water solubility and stability, the compounds of Formula I can be prepared in a variety of forms suitable for the utilization of sweetening agents. Typical forms which can be employed are: solid forms such as powders, tablets, granules, and dragees; and liquid forms such as solutions, suspensions, syrups, emulsions as well as other commonly employed forms particularly suited for combination with edible materials. These forms can consist of the compounds of Formula I apart or in association with non-toxic sweetening agent carriers, i.e. non-toxic substances commonly employed in association with sweetening agents. Such suitable carriers include liquids such as water, ethanol, sorbitol, glycerol, citric acid, corn oil, peanut oil, soybean oil, sesame oil, propylene glycol, corn syrup, maple syrup and liquid paraffin, and solids such as lactose, cellulose, starch, dextrin and other modified starches, calcium phosphate and di- and tri-calcium sulfate. Obviously incompatible for use with the sweetening agents of Formula I would be toxic carriers such as methanol and dimethyl sulfoxide.

Likewise useful and compatible are those novel compositions containing a dipeptide of Formula I combined with a known sweetening agent such as saccharin or cyclamate, which combinations, as a result of the observed synergistic effect, possess enhanced sweetening potency.

Below are examples of specific edible materials which can be sweetened by the addition of a compound of Formula I, or by a novel combination of the dipeptide sweetening composition of Formula I with a known sweetening agent such as sucrose, saccharin and cyclamate, apart or in combination with a non-toxic sweetening agent. Such examples include: fruits; vegetables; juices; meat products such as ham, bacon and sausage; egg products; fruit concentrates; gelatins and gelatin-like products such as jams, jelly, preserves etc.; milk products such as ice cream, sour cream and sherbet; icings; syrups including molasses; corn, wheat, rye, soybean, oat and rice products such as bread, cereals, pasta and cake mixes; fish; cheese and cheese products; nut meats and nut products; beverages such as coffee tea, non-carbonated and carbonated soft drinks, beers, wines and other liquors; and confections such as candy and fruit flavored drops; and condiments such as herbs, spices and seasonings; flavor enhancers such as monosodium glutamate; and chewing gum. Addition illustration of the type of commercial products in which the sweetening agent or combinations thereof with known sweetening agents can be used are prepared packaged products, such as dietetic sugar, liquid sweeteners, granulated flavor mixes which upon reconstitution with water provides non-carbonated drinks, instant pudding mixes, instant coffee and tea, coffee whiteners, malted milk mixes, pet foods, livestock feed, tobacco, and consumable toiletries such as mouth washes and toothpaste as well as proprietary and non-proprietary pharmaceutical preparations and other products of the food, pharmaceutical and sundries industries. Illustrations of the preparation of four such sweetened products are given below.

COFFEE

To rehydrated hot brewed coffee was added a sample of L-α-aspartyl-L1hexahydrophenylalanine methyl ester until the content of the dipeptide in the solution reached 0.033%. Upon comparison with similarly compared solutions of coffee sweetened with sucrose it was found that to achieve the sustained degree of sweetness a 4% solution of sucrose was required. Thus, in black coffee the dipeptide of Formula I exhibited a sweetness potency of 150 times that of sucrose.

POWDERED BEVERAGE CONCENTRATE

The powder was prepared by mixing 0.05 part of citric acid, 0.04 part of imitation strawberry flavoring, 0.090 part of L-α-aspartyl-L-hexahydrophenylalanine methyl ester, and 0.609 part of lactose. The powder was then dissolved in 100 parts of spring water, and the resulting beverage was evaluated at room temperature. The sample was compared with a similar sample, prepared as indicated above except that 9 parts sucrose and 0.87 part dextrose were substituted for the dipeptide ingredient. Upon tasting it was determined that the two samples achieved the same degree of sweetness and hence it was concluded that in powdered concentrates of this type, the compound of Formula I exhibited 125 times the sweetness potency of sucrose.

CARBONATED ORANGE SODA

A stock supply of bottler's syrup is prepared by mixing 5.5 ml. of a 50% aqueous citric acid solution with 150 ml. of water, dissolving 2 g. of L-α-aspartyl-L-hexahydrotyrosine methyl ester in that solution, adding successively 7.02 ml. of orange flavor base and 2.7 g. of sodium benzoate and diluting that mixture to 200 ml. with water. 1 oz. samples of that bottler's syrup are transferred to 6 oz. bottles and 100 ml. of cold tap water is added to each bottle. To each bottle 42 ml. of cold charged bottling water (5 volumes carbon dioxide) is then added to achieve carbonation. Each bottle is capped and the contents mixed. Comparison of the latter samples with orange soda containing the quantity of sucrose 50 times that of the named dipeptide derivatives reveal no detectable difference in sweetness.

SWEETENING SOLUTION FORMULATION

Warm 1.0 gallon of distilled or de-ionized water to 160–180° F. and add 0.35 oz. of benzoic acid and .175 oz. of methyl p-hydroxybenzoate. After these preservatives are dissolved, add 1.0 gallon more of distilled or de-ionized water. Bring the solution to room temperature. Then add 0.3 lb. of L-α-aspartyl - L - hexahydrophenylalanine methyl ester. Add distilled or de-ionized water to bring the volume to 2.5 gallons. Each teaspoon of the sweetening solution is equivalent to about 1.6 teaspoons of sugar.

It has been determined that the sweetening property of the dipeptide substances of this invention is dependent upon the stereochemistry of the individual amino acids, e.g. aspartic acid, phenylalanine, tyrosine and tyrosine O-alkyl ethers from which the peptides are derived. Each of the amino acids, can exist in either the D or L form, but it has been determined that the L-L isomers, e.g. L-α-aspartyl - L - hexahydrophenylalanine ester derivatives, are especially sweet while the corresponding D-D, D-L and L-D isomers are not. Moreover, mixtures containing the L-L isomers, i.e. DL-DL, L-DL or DL-L share that property of sweetness also.

The sweetening agents of the present invention are particularly useful to diabetics as substitutes for sugar. They are additionally lacking in the unpleasant aftertaste exhibited by such synthetic sweeteners such as saccharin and cyclamate.

The novel compounds of Formula I are conveniently produced by reducing the corresponding unsaturated compounds of the formula

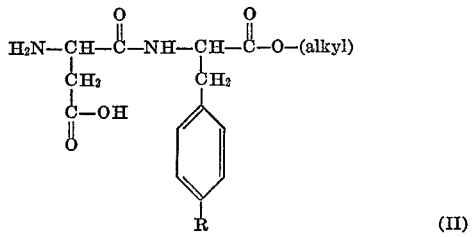

(II)

wherein R and alkyl radicals have the same meanings indicated above, with hydrogen and a suitable hydrogenation catalyst, for example 5% rhodium-on-carbon, under mild conditions such as room temperature and a pressure of 2–4 atmospheres. This process is specifically illustrated by the reaction of L-α-aspartyl-L-phenylalanine methyl ester with hydrogen and a 5% rhodium-on-carbon catalyst at room temperature and a pressure of 3 atmospheres to afford L-α-aspartyl-L-hexahydrophenylalanine methyl ester.

The invention will appear more fully from the example which follows. This example is set forth by way of illustration only and it will be understood that the invention is not to be construed as limited either in spirit or in scope by the details contained therein as many modifications both in materials and methods will be apparent from this disclosure to those skilled in the art. In the example temperatures are given in degrees centigrade (° C.) and quantities of materials are expressed in parts by weight except where otherwise noted. Optical rotation determinations are conducted in aqueous solution.

Example

To a solution of 7.9 parts of L-α-aspartyl-L-phenylalanine methyl ester in 250 parts of .1 M acetic acid is added 3 parts of 5% rhodium-on-carbon catalyst and the mixture is hydrogenated at room temperature and at 3 atmospheres pressure. The reaction is allowed to proceed until 3 molecular equivalents of hydrogen are absorbed. The catalyst is removed by filtration and the filtrate is concentrated under reduced pressure in a water bath at 40°. The resulting oil is twice dissolved in anhydrous ethanol and the ethanol is removed by distillation. The residual oil is stirred with diethyl ether to give a solid material, which is dried in vacuo to afford, as a crystalline material, L-α-aspartyl - L - hexahydrophenylalanine methyl ester, melting with effervescence at about 130–137°. The compound is further characterized by an optical rotation of about −13.5°.

The substitution of 4 parts of L-α-aspartyl-L-tyrosine methyl ester for the phenylalanine derivative employed above affords, upon hydrogenation in the identical manner L-α-aspartyl - L - hexahydrotyrosine methyl ester, melting with effervescence at about 101–135° and further characterized by an optical rotation of −12.5°.

In a similar manner substitution of the appropriate starting material of Formula II for the L-α-aspartyl-L-phenylalanine methyl ester employed in the procedure detailed above affords upon hydrogenation the following product of Formula I:

L-α-aspartyl-L-hexahydrophenylalanine ethyl ester,
L-α-aspartyl-L-hexahydro-O-methyltyrosine methyl ester,
L-α-aspartyl-L-hexahydrophenylalanine propyl ester,
L-α-aspartyl-L-hexahydro-O-butyltyrosine ethyl ester.

What is claimed is:

1. A compound of the formula

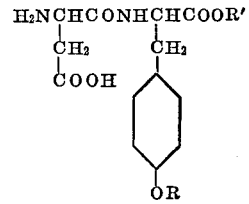

wherein R is hydrogen or an alkyl radical containing 1–7 carbon atoms, R' is an alkyl radical containing 1–7 carbon atoms and the stereochemical configuration is L-L, DL-L, L-DL or DL-DL.

2. As in claim 1, a compound of the formula

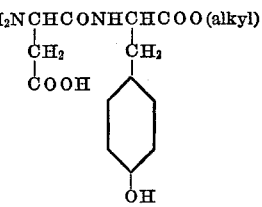

wherein the alkyl radical contains 1–7 carbon atoms and the stereochemical configuration is L-L, DL-L, L-DL or DL-DL.

3. As in claim 1, a compound of the formula

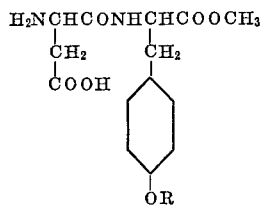

wherein R is hydrogen or an alkyl radical containing 1–7 carbon atoms and the stereochemical configuration is L-L, DL-L, L-DL or DL-DL.

4. As in claim 1, a compound of the formula

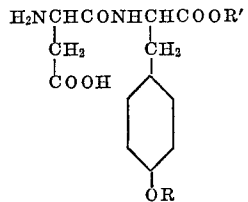

wherein R is hydrogen or an alkyl radical containing 1–7 carbon atoms, R′ is an alkyl radical containing 1–7 carbon atoms and the stereochemical configuration is L-L.

5. L-α-aspartyl-L-hexahydrotyrosine methyl ester.

References Cited

UNITED STATES PATENTS

| | | | |
|---|---|---|---|
| 3,475,403 | 10/1969 | Mazur et al. | 260—112.5 |
| 3,492,131 | 1/1970 | Schlatter | 99—141 |
| 3,642,491 | 2/1972 | Schlatter. | |

FOREIGN PATENTS

| | | | |
|---|---|---|---|
| 20,420 | 10/1968 | Australia | 260—112.5 |

OTHER REFERENCES

Gregory et al., J. Chem. Soc. 1968 c, 531–540.
Waser et al., Helv. Chim. Acta 7, 748–749 (1924).
Mazur et al., J. Am. Chem. Soc. 91, 2684–2691 (1969).

ELBERT L. ROBERTS, Primary Examiner

U.S. Cl. X.R.

99—141 A